US008018912B2

(12) United States Patent  
Habetha (10) Patent No.: US 8,018,912 B2  
(45) Date of Patent: Sep. 13, 2011

(54) SYSTEM AND METHOD FOR A DYNAMIC BEACON PERIOD IN A MAC DISTRIBUTED RESERVATION PROTOCOL

(75) Inventor: Joerg Habetha, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 1369 days.

(21) Appl. No.: 10/597,405

(22) PCT Filed: Feb. 4, 2005

(86) PCT No.: PCT/IB2005/050474  
§ 371 (c)(1),  
(2), (4) Date: Jul. 24, 2006

(87) PCT Pub. No.: WO2005/076533  
PCT Pub. Date: Aug. 18, 2005

(65) Prior Publication Data  
US 2008/0259877 A1    Oct. 23, 2008

Related U.S. Application Data

(60) Provisional application No. 60/542,529, filed on Feb. 6, 2004, provisional application No. 60/628,410, filed on Nov. 16, 2004.

(51) Int. Cl.  
*H04J 3/00* (2006.01)

(52) U.S. Cl. ........ 370/345; 370/328; 370/329; 370/330; 370/337; 370/338; 370/336; 370/343; 370/348; 370/431; 370/441; 370/442; 370/458; 370/462; 455/41.2; 455/450; 455/451; 455/452.1; 455/452.2

(58) Field of Classification Search ............ 455/450, 455/451, 452.1, 452.2, 574, 41.2; 370/328, 370/329, 330, 338, 468, 348, 395.21, 337, 343, 345, 347, 349, 431, 442, 443, 458, 461, 462; 709/223–230  
See application file for complete search history.

(56) References Cited

U.S. PATENT DOCUMENTS

| | | | | |
|---|---|---|---|---|
| 6,665,311 | B2 * | 12/2003 | Kondylis et al. | 370/462 |
| 6,671,525 | B2 * | 12/2003 | Allen et al. | 455/574 |
| 6,944,446 | B1 * | 9/2005 | Kubler et al. | 455/422.1 |
| 7,088,702 | B2 * | 8/2006 | Shvodian | 370/348 |
| 7,245,947 | B2 * | 7/2007 | Salokannel et al. | 455/574 |
| 7,333,460 | B2 * | 2/2008 | Vaisanen et al. | 370/338 |
| 7,411,919 | B2 * | 8/2008 | Tavli et al. | 370/315 |
| 7,496,081 | B2 * | 2/2009 | Salokannel et al. | 370/348 |
| 2003/0016732 | A1 * | 1/2003 | Miklos et al. | 375/132 |
| 2003/0163579 | A1 * | 8/2003 | Knauerhase et al. | 709/230 |
| 2004/0253996 | A1 * | 12/2004 | Chen et al. | 455/574 |
| 2005/0174953 | A1 * | 8/2005 | Ho | 370/310 |

* cited by examiner

Primary Examiner — Olumide T Ajibade Akonai  
(74) Attorney, Agent, or Firm — Larry Liberchuk (57) ABSTRACT

A system (400), device (401), and method are provided for decentralized medium access control comprising periodic beacon (600) transmissions of all active devices in beacon slots (204) (302) (303), grouping such beacon slots (204) (302) (303) in at least one contiguous dynamic beacon period (301), and expanding or shrinking this at least one contiguous dynamic beacon period (301) depending on the number of occupied beacon slots (204) (302) (303). The dynamic beacon period (301) adapts to devices (401) joining and leaving the network (400) as well as to collisions of beacon frames (600) on the medium (410).

25 Claims, 8 Drawing Sheets

FIG. 1

(Prior Art)

SYSTEM AND METHOD FOR A DYNAMIC BEACON PERIOD IN A MAC DISTRIBUTED RESERVATION PROTOCOL

This application claims the benefit of U.S. Provisional Application Ser. No. 60/542,529, filed Feb. 6, 2004 and U.S. Provisional Application Ser. No. 60/628,410, filed Nov. 16, 2004, both of which are incorporated in whole by reference.

The present invention relates to a protocol for ultra wideband (UWB) medium access control (MAC). More particularly, the present invention relates to a dynamic beacon period in a protocol for UWB MAC. Most particularly, the present invention relates to shortening and prolonging a beacon phase in a protocol for a UWB MAC comprising a distributed reservation protocol (DRP). The invention also relates to any wireless system that uses a MAC protocol comprising a distributed reservation protocol.

Wireless networks use beacons to establish and maintain communication. One MAC protocol eliminates the need for a network infrastructure by distributing functions across all nodes of a wireless network. In this MAC protocol there is no access point or central coordinator for a wireless personal area network (WPAN), see MultiBand OFDM Alliance (MBOA) MAC Wireless Medium Access Control (MAC) Specification For High Rate Wireless Personal Area Networks (WPANs), Draft 0.6, July 2004, which is hereby incorporated by reference in its entirety. Further, this specification comprises a distributed reservation protocol (DRP) to announce device airtime utilization via beacon transmission, recognize neighboring devices' airtime utilization by receiving beacons from them, and respect other devices' airtime utilization prior to transmitting/receiving data. The inventor of the present invention has been one of the authors of the baseline for this new standard and has contributed the present invention to the baseline proposal. In the meantime, several specific additions to this invention have been specified by MBOA.

Figure 1:
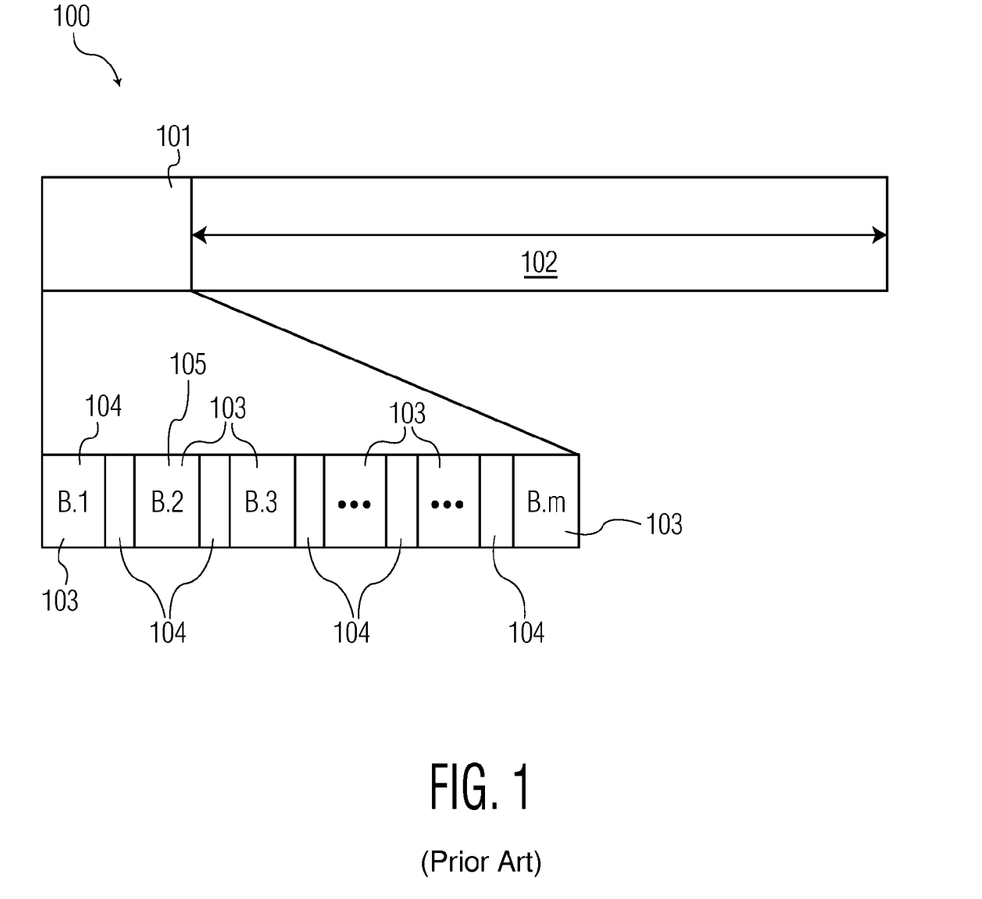
FIG. 1 illustrates the overall superframe layout of the prior art.

According to this invention and to the associated MBOA standard, referring to FIG. 1, in order to maintain coordination between communicating devices, all devices are required to regularly transmit a beacon 103. In order to transmit/receive beacons 103 within an area, devices reserve a period of time called a beacon period (BP) 101 strictly for beacon transmission and reception. The group of devices that share this beacon period 101 is termed a beacon group, see FIG. 2. Beacon 103 provides the basic timing for the network and transmits information regarding isochronous reservations. The basic timing structure is a superframe 100 100.1 100.N. The specific parameters of the protocol that have been chosen by MBOA are a superframe 100 length of 65,536 [usec], which is composed of 256 Media Access Slots (MAS) 203, where each MAS length is 256 [usec]. MAS slots 203 are numbered from 0 to 255. Several slot types are defined depending on how the MAS 203 are utilized by the device or devices nearby.

Before communication can be established, a device must create its own beacon group or join an existing beacon group 201. For each BP 101, consecutive MAS 203 are utilized as beacon slots 203, where all the devices transmit their beacons 103. The start time of a superframe 100 is determined by the beginning of a beacon period 101 and is defined as a beacon period start time (BPST) and MAS slots 203 are numbered relative to this starting time. When a device initiates a new beaconing group, it defines the superframe boundary at any timeslot that does not collide with other beacon groups' timeslot reservations.

This makes the distributed MAC protocol very well suited for ad-hoc applications and peer-to-peer networking. Furthermore, the reservation of the medium by the devices on which the distributed MAC is based eliminates sensing and collision times on the medium. However, a fixed-length beacon period during which all beacons can be sent is likely to contain empty beacon slots or not enough beacon slots, thereby contributing to inefficient utilization of the shared medium.

A dynamic beacon period is needed to mitigate the inefficient use of the medium occasioned by a fixed beacon period while at the same time allowing for a large maximum number of devices participating in the network.

Figure 3:
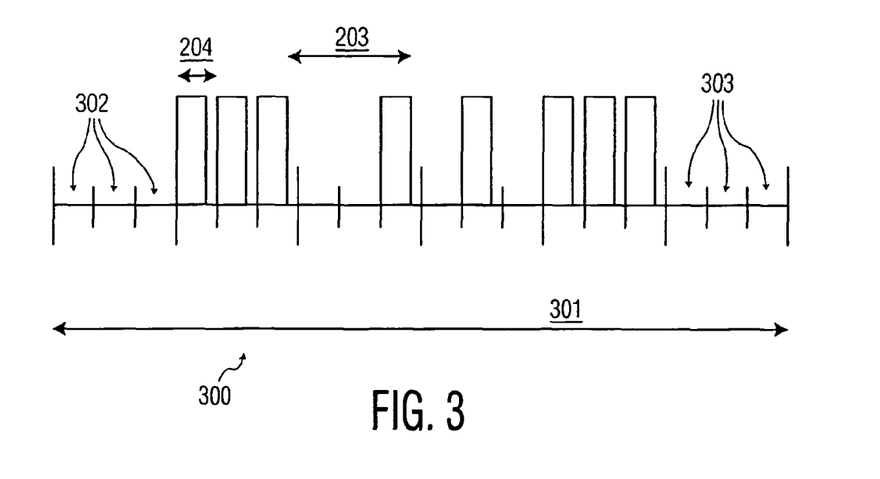
FIG. 3 illustrates a dynamic BP of the present invention.

According to the present invention, devices that intend to participate in communication with other devices send a beacon during a dynamic BP 301. The structure of the BP 301 is shown in FIG. 3. A device does not transmit frames other than beacon frames 103 during a BP 301 and scans for other beacon frames during the BP 301. The BP 301 of the present invention is dynamic in length and includes a variable number of beacon slots 303. Even though dynamic in length, the BP has a certain maximum length, given in a number of MAS 203 or beacon slots 204. Each MAS slot 203 contains a predetermined number of beacon slots 204 of duration BeaconSlotLength 802, see FIG. 8. The BP 301 may include a certain number of slots at the beginning or end 302 that are empty or reserved for special purposes.

Figure 2:
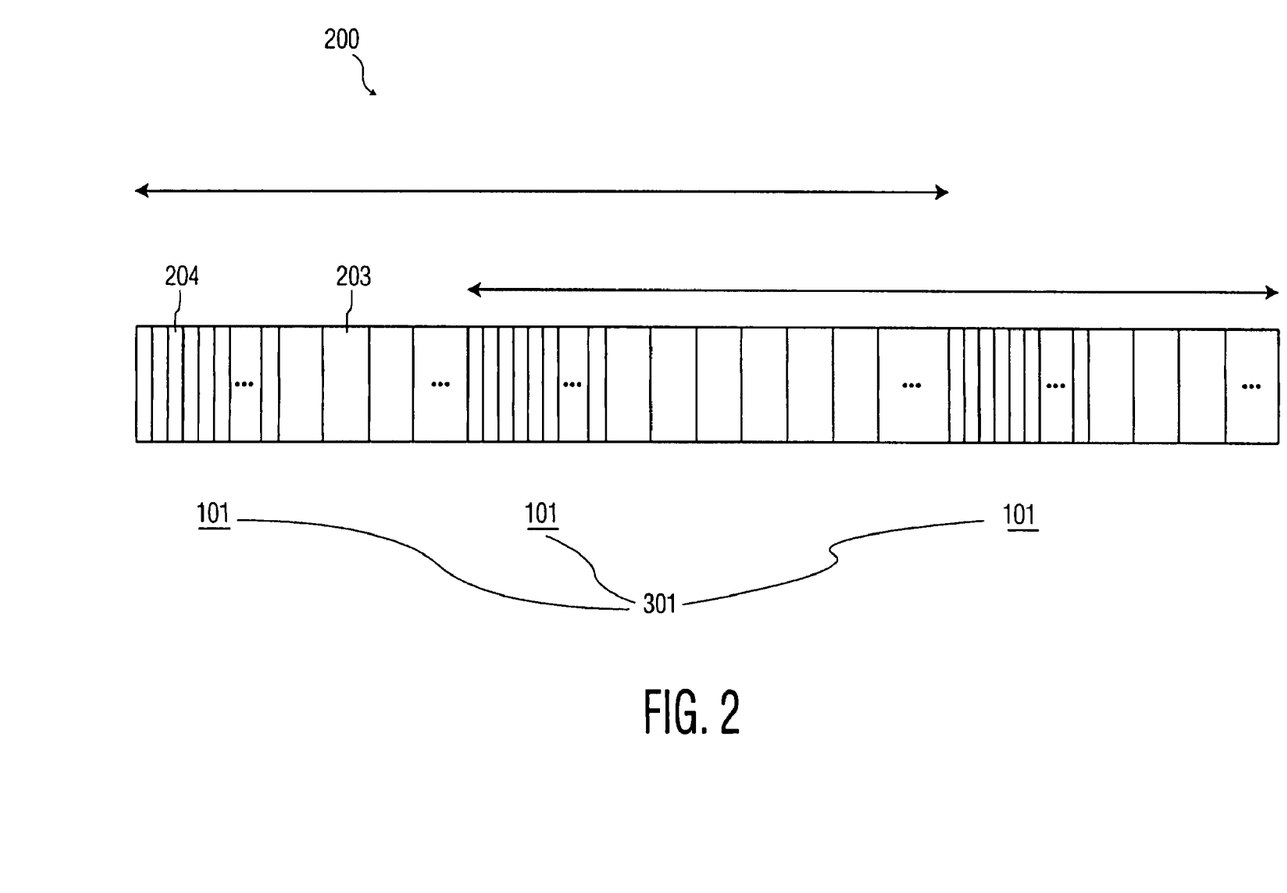
FIG. 2 illustrates the superframe structure of the present invention.

According to the present invention, time is divided into superframes 100, as illustrated in FIG. 2. At the beginning of each superframe 100 there is a dynamic BP 301, which is followed by a data transmission interval/phase 102. It is also possible that a superframe contains several BPs of different beacon groups as shown in FIG. 2. Each beacon group has its own superframe boundaries. The number of beacon slots 204 in a BP can increase and decrease depending on the number of occupied beacon slots, rsp.devices, in the beacon group.

Figure 8:
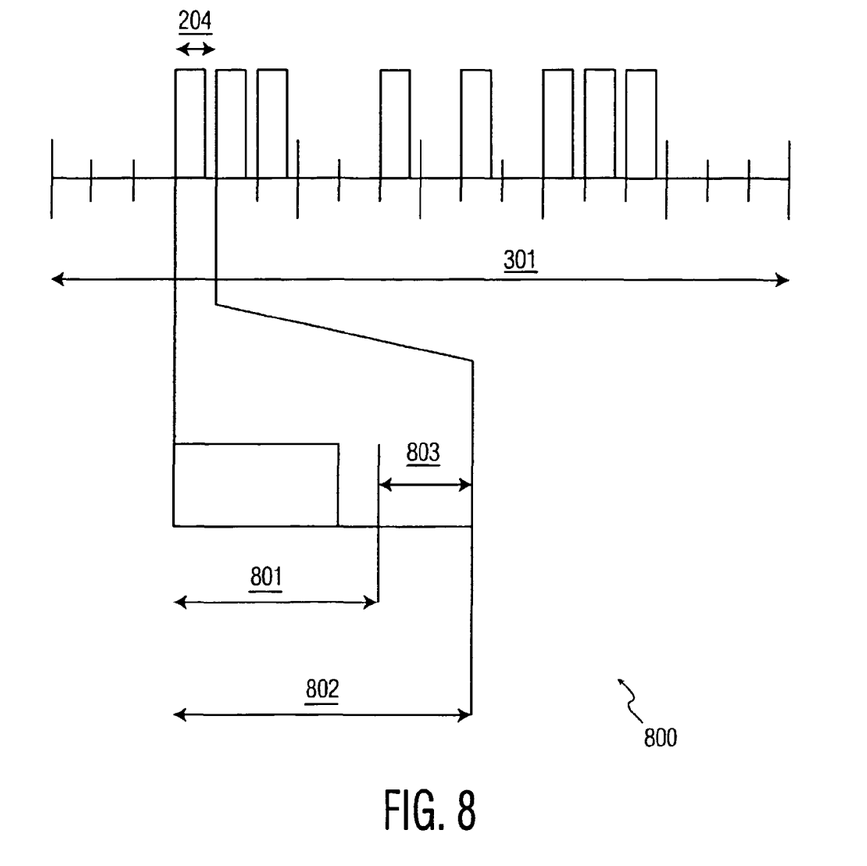
FIG. 8 illustrates a Beacon Frame contained in a Dynamic BP.

Each of a plurality of the beacon frames 103 within the BP 101 is followed by a short inter-frame space (SIFS) plus mBeaconGuardTime 803. The maximum length of a beacon frame is mMaxBeaconLength 801. Each beacon slot 303 has a length of BeaconSlotLength 802.

It is to be understood by persons of ordinary skill in the art that the following descriptions are provided for purposes of illustration and not for limitation. An artisan understands that there are many variations that lie within the spirit of the invention and the scope of the appended claims. Unnecessary details of known functions and operations may be omitted from the current description so as not to obscure the present invention.

Figure 4:
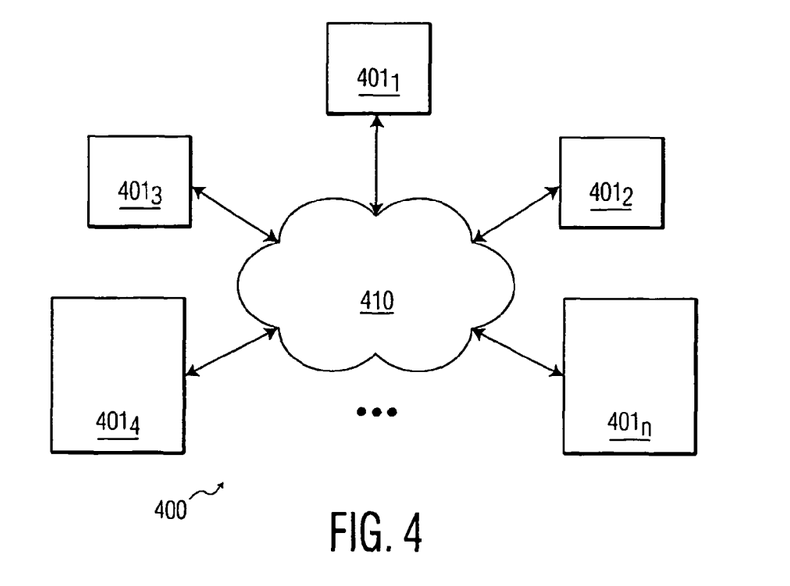
FIG. 4 illustrates a wireless network of devices modified according to the present invention.

FIG. 4 illustrates a representative wireless personal area network 400 whereto embodiments of the present invention are to be applied. The network includes a plurality of wireless personal communication devices 401. In the traditional approach, each device 401 can join any ad-hoc network within its radio range 402 and therefore can participate in more than one BP.

Figure 5:
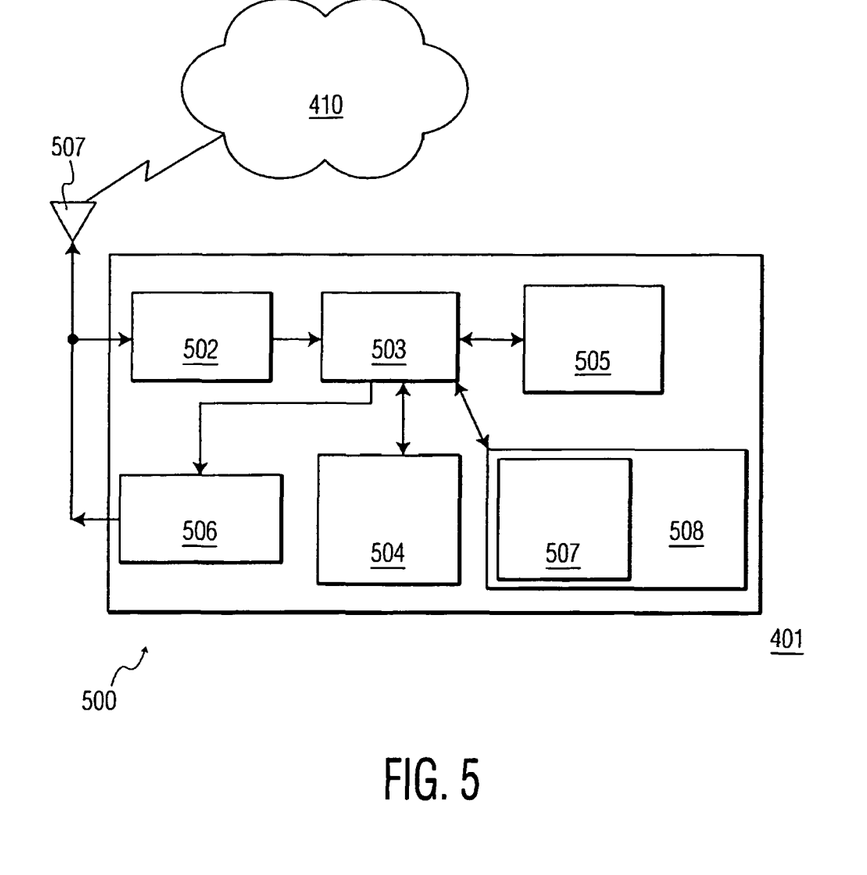
FIG. 5 illustrates a device modified according to the present invention.

Each wireless device 401 within the WPAN 400 shown in FIG. 4 may include a system including an architecture that is illustrated in FIG. 5. As shown, each wireless device 401 may include an antenna 506 coupled to a receiver 502 that communicates over the wireless medium 510. The devices 401 each further comprise a processor 503 and a Beacon Processing Module 504. For example, in a device the processor 503 is configured to receive from the receiver 502 a beacon frame 601 including one or more Beacon Period Occupancy Information Elements (BPOIE) $602_i$ having corresponding beacon positions and to process the beacon frame 601 using the Beacon Processing Module 504 to determine, i.e., the devices of the beacon group and their characteristics and store them in a device capability table 507 which is part of a memory 508. The memory, in addition, stores information concerning the types and numbers of beacon slots in each dynamic beacon period and records the dynamic length of each dynamic beacon period. In a device 401, the processor 503 is further configured to use the Beacon Processing Module 504 to extend the BP 101 and contract the BP 101 as needed, thereby forming a dynamic BP 301.

After a device 401 is powered up, it scans for beacons 103. If, after scanning for beacons, the device 401 has not detected any beacons 103, before the device transmits or receives MAC frames, it sends a beacon to create a BP 301. This establishes the reference start of the BP and the superframe, which may be several beacon slots before the transmitted beacon. The resulting empty slots 302 may be used by other devices for purposes that are out of the scope of the present invention. The device 401 continues to send a beacon 103 in the BP of each successive superframe 100 until it detects a beacon collision as described below.

A beacon frame includes information regarding the length of the BP. This length information may point beyond the last occupied beacon slot. The resulting beacon slots 303 may also be used for special purposes. According to this invention one such purpose may be the expansion of the BP to accommodate additional devices.

If the device 401 detects one or more beacons 103, it does not create a new BP 301. Instead, the device determines its current beacon group from the received beacons 103. The device's current beacon group comprises the devices from which the device 401 received at least one beacon frame 103 during the last mLostBeacons superframes 100. If the device 401 receives beacons that are located in different BPs, it selects one or several periods in which to send its own beacon before communicating with another device.

The start of the BP 301 coincides with the start of the associated superframe 100 and can be deduced from the beacon slot number included in a beacon. The end of the BP 301 is also announced in a beacon given by the last occupied beacon slot or MAS, plus eventually a certain number of special-purpose slots 303. Different devices may announce different BP lengths, as they may have different neighbours and therefore detect a different number of occupied beacon slots. This is one of the reasons why the BP length is limited by a certain maximum length.

There are several alternatives for selection of a beacon slot when joining the network. Once a slot has been chosen, the device 401 sends a beacon in the same beacon slot in each successive superframe 100 until it detects a beacon collision. If a beacon collision is detected, a new slot is selected in one of the ways that can be also used for joining a network.

Figure 6:
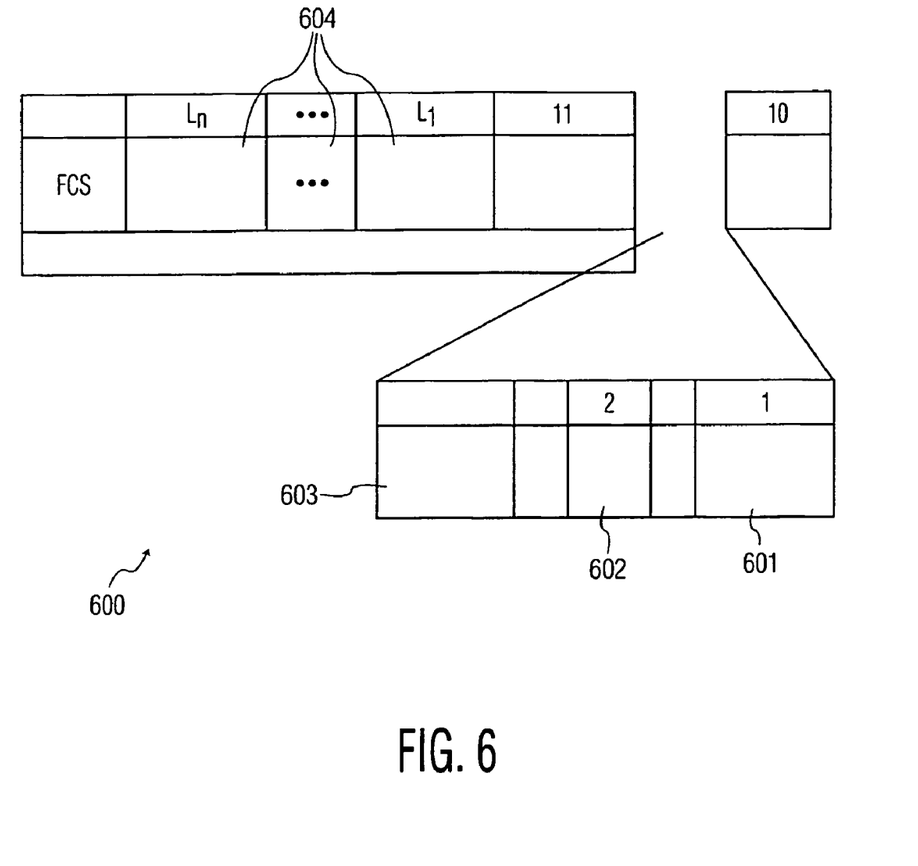
FIG. 6 illustrates a beacon frame format.

In a preferred embodiment, during a BP 301 all devices that are either in an active state or in a standard power-save mode transmit their own beacon 103. The frame body of a beacon 103 comprises the following fields and information elements (IE), as illustrated in FIG. 6:
  Slot Number 601;
  Device Identifier 602;
  MAC address 603; and,
  a certain number of Information Elements (IEs) 604.

The Slot Number 601 is the slot in which the beacon is transmitted and represents the order of the beacons, see beacon slot number 308 in FIG. 3. With a Slot Number field size of 8 bits, 256 devices can be supported simultaneously.

The Device ID 602 is a relatively short ID (e.g., 16 bit) that is derived, for example, from the 48-bit (or 64-bit) MAC address of the device (or randomly chosen) and has the purpose to save overhead when addressing the device.

The MAC address 603 is the 48-bit (or 64-bit) full MAC address of the device.

Figure 7A:
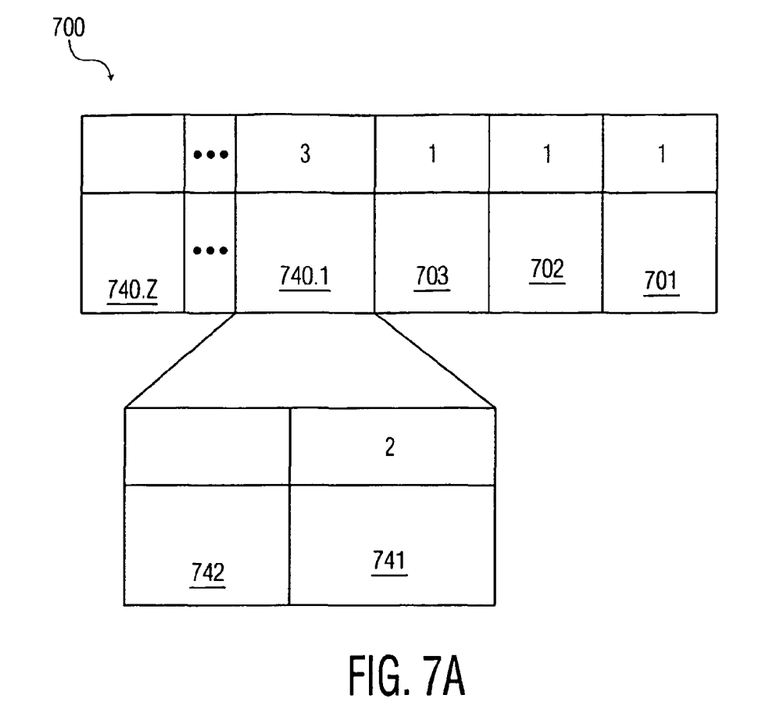
FIG. 7A illustrates a Dynamic Beacon Period Occupancy Information Element format.

The Information Elements (IEs) 604 can be of different types. The type of information element is identified by an Information Element Identifier (ID) 701. Only a Beacon Period Occupancy Information Element (BPOIE) 700 is described in more detail in this invention, see FIGS. 7A and 7B. Several alternative formats of the BPOIE are possible without affecting the core of the present invention. In a first alternative, shown in FIG. 7A, a BPOIE 700 contains a list of Beacon Slot Info fields 740 of received beacon frames 103 of other devices in the same beacon group. Each list element 740 of the BPOIE 700 includes the beacon slot number (position) 742 used by those devices in the same BP and a short device ID 741 of the device that sent the beacon frame in that beacon slot 204. This information can be used to detect beacon collisions. The BPOIE 700 is required in each beacon frame 103 because other devices must be informed whether their own beacon frame has been successfully received or whether a beacon collision has occurred. The latter can be due to the fact that two devices have randomly chosen the same beacon position in a BP 301 or due to a hidden terminal problem in mesh network scenarios. In the latter scenario, a device might receive two beacon frames 103 from different devices at the same position in a BP 301 if these two other devices could not hear each other and are not aware of the other device's beacon position. The BP Length 703 is the length of the BP measured in Beacon slots 303.

Figure 7B:
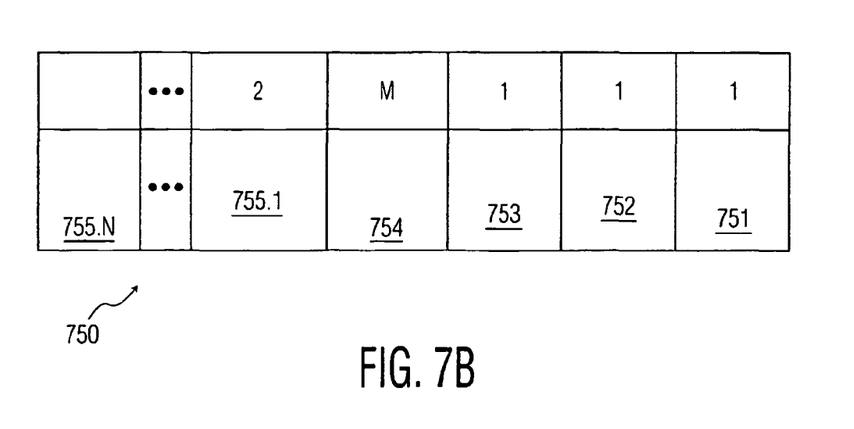
FIG. 7B illustrates a Beacon Slot Information Field Format.

In a second alternative, shown in FIG. 7B, a BPOIE 750 contains a bitmap 754, in which one or several bits per beacon slot indicate, for example, whether the respective slot is occupied or not. The bitmap is followed by a list of DEVIDs 755 of devices that occupy the slots in the bitmap. Similar to the first embodiment, this information can be used to detect beacon collisions. The BP Length 753 is again the length of the BP measured in Beacon slots 303.

In the present invention, devices create a BP of dynamic length, which can be dynamically expanded or contracted. Each device maintains its own BP length. Other devices observe that a device has expanded or contracted the BP by a new BP length value in the beacon. In order to avoid beacon and data collisions, a device chooses the BP length long enough to cover at least the last occupied beacon slot that the device has observed in the previous superframe. A BP expansion may be the result of a device sending a beacon in a beacon slot after the previously last-occupied beacon slot in the BP. The BP cannot be expanded beyond a pre-defined maximum length, which provides an upper bound on the maximum number of devices per BP. A contraction of the BP may be carried out, for example, if devices have stopped transmitting a beacon or shifted their beacon positions resulting in holes—e.g., empty beacon slots—within the BP. It is the purpose of the present invention to adapt the size of the BP to the number of occupied beacon slots—i.e., devices active in the BP.

There is a plurality of alternatives that define how a device chooses a beacon slot when joining an existing BP. All have in common that a device never chooses a beacon slot that is already occupied by another device. A joining device detects that a beacon slot is occupied by scanning the beacon slot as well as by decoding the BPOIE of other beacons and finding information on which beacon slots are occupied.

In a preferred embodiment, a joining device chooses a beacon slot after the last occupied beacon slot, for example, either by choosing the first free slot or by randomly choosing a slot in a window of free slots.

In an alternative, a joining device chooses any free slot, which may be a free slot in the middle of the BP.

In another alternative a joining device is only allowed to choose a slot among a certain number of special-purpose slots, for example, at the beginning of the BP.

Combinations of these alternatives are possible—for example, a joining device chooses a slot after the last occupied slot and additionally transmits a beacon for a pre-determined number of superframes in a special-purpose slot to indicate that a new device has joined the network. Or, a device first transmits a beacon in a special-purpose slot for a pre-determined number of superframes and then relocates its beacon to its permanent slot at the end or in the middle of the BP.

Each device maintains a bitmap 505 to store the occupancy of beacon slots 204 and the associated DEVID in its beacon group. A beacon slot 204 is marked as busy in the bitmap 505 when:
  a) a beacon frame 103 is received during that beacon slot 204; or
  b) the beacon slot 204 is included in a Beacon Slot Info field 740, rsp. marked as occupied in the beacon slot bitmap 753 of a BPOIE 700 received from a device in the same beacon group.

A beacon slot 303 is changed from busy to idle in the bitmap 505 when:
  a) a beacon 103 has not been received in the slot during mMaxLostBeacons consecutive superframes; and
  b) the slot information for that beacon slot has not been included, rsp. the respective bit in the beacon slot bitmap not set in BPOIEs 700 received from any device in the same beacon group during mMaxLostBeacons consecutive superframes.

A device detects that its beacon has collided with another beacon when a different DEVID is included in its own beacon slot in the BPOIE of a beacon that it has received. After a beacon collision has been detected, a device switches its beacon slot (either deterministically or with a certain probability). For this reason, a beacon collision is very similar to the case of a joining device since the same alternatives are available or the selection of a new beacon slot:
  the device chooses a beacon slot after the last occupied beacon slot—i.e., either the first free slot or randomly a slot in a window of free slots;
  the device chooses any free slot, which may be, for example, a free slot in the middle of the BP that has been freed by another device;
  the device chooses a slot among a certain number of special purpose slots—i.e., at the beginning of the BP; and,
  the device chooses a beacon slot according to a combination of the previous rules—i.e., choosing a slot after the last occupied slot and additionally transmitting a beacon for a certain number of superframes in a special-purpose slot, or first transmitting a beacon in a special-purpose slot for a certain number of superframes and then moving to its permanent slot at the end or in the middle of the BP.

Before relocating its slot, a device may announce the relocation of its beacon.

Figure 9A:
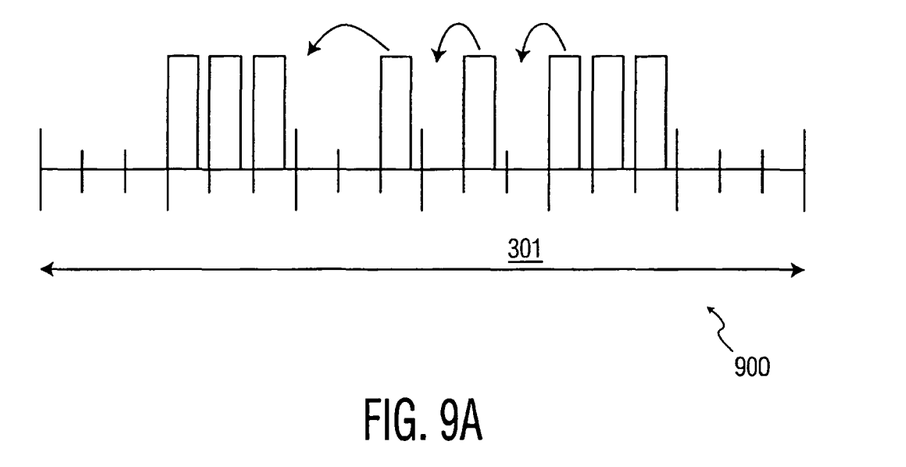
FIG. 9 illustrates moving Beacon Frames within a Dynamic BP.

A permanent and automatic contraction of the dynamic beacon period is necessary in order to avoid the situation in which beacon slots 204 that have been vacated are never reoccupied and the size of the BP 101 constantly increases. Devices beaconing in the BP must leave their current beacon slot and move to a different slot to achieve a reduction in BP length. A device relocates its beacon to the next free beacon slot in the direction of the beginning of the BP, as illustrated in FIG. 9A. The special-purpose slots may not be considered as free for the contraction operation. Devices are also allowed to jump over beacons of devices that are not willing or able to move to a free slot. Within a deterministic number of steps the BP will be compacted.

In another aspect, a device relocates its beacon to any free slot that the device has detected in the direction of the beginning of the BP.

Figure 9B:
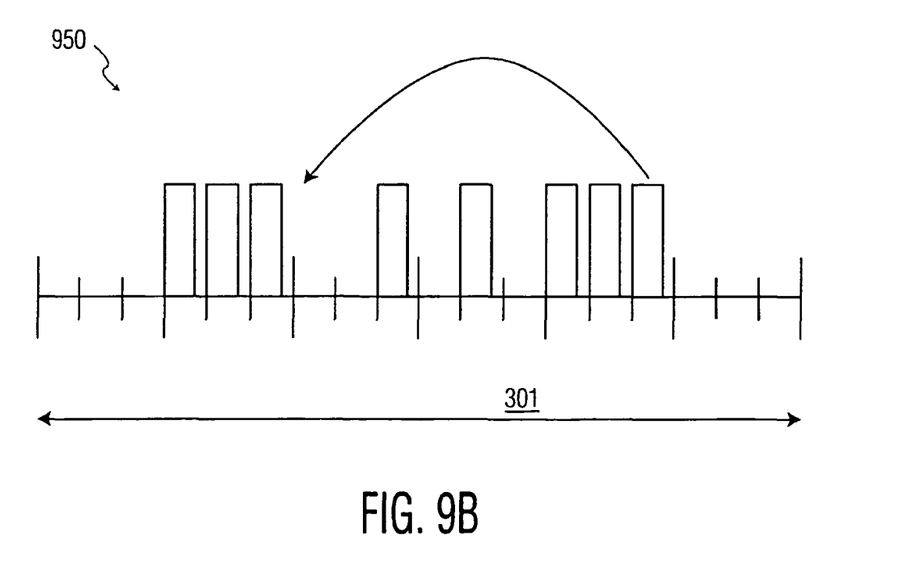

In another aspect, only a single device is allowed to move in one step, which might be, for example, the device that is transmitting the last beacon in the BP. A device can check whether it transmits the last beacon in the BP by scanning all beacons of its neighbors and by evaluating the BPOIE information in the neighbor's beacons. This single device then moves to a specific slot, such as the first free slot in the BP (which is not a special-purpose slot), as shown in FIG. 9B. After several such relocations the BP is compacted.

All alternatives can be combined with a switching device transmitting a beacon in a special-purpose slot prior to or in parallel with transmitting the beacon in the new slot. Alternatively, a switching device transmits two beacons: one in the old and one in the new beacon position, in parallel for a pre-determined number of superframes.

In all alternatives, a device may announce the relocation of its beacon prior to or in parallel with carrying out the switch.

While the preferred embodiments of the present invention have been illustrated and described, it will be understood by those skilled in the art that the management frame, device architecture and methods as described herein are illustrative and various changes and modifications may be made and equivalents may be substituted for elements thereof without departing from the true scope of the present invention. In addition, many modifications may be made to adapt the teachings of the present invention to a particular situation without departing from its central scope. Therefore, it is intended that the present invention not be limited to the particular embodiments disclosed as the best mode contemplated for carrying out the present invention, but that the present invention include all embodiments falling within the scope of the appended claims.

I claim:

1. A method of decentralized medium access control in a communications network including at least one wireless device, comprising:
  dividing time into a sequence of at least one superframe comprising at least one dynamic beacon period and at least one data transmission period, said dynamic beacon period having a predetermined maximum length and including a variable plurality of beacon slots;

beaconing by transmission of a beacon frame in a unique one of said plurality of beacon slots by every device in an awake state, said beacon frame including information; and grouping said plurality of beacon slots into at least one contiguous dynamic beacon period, wherein at least one free beacon slot of said at least one contiguous dynamic beacon period is determined based on beacons received from other devices and information included in said received beacons.

2. The method of claim 1, further comprising said dynamic beacon period dynamically expanding or shrinking in length by a multiple N≧1 of beacon slots within said predetermined maximum size in accordance with the number of occupied beacon slots.

3. The method of claim 2, further comprising:
receiving by each beaconing device beacons transmitted by other devices within a radio range of the beaconing device; and
each beaconing device autonomously determining the length of said at least one contiguous dynamic beacon period in which it is beaconing based on the received beacons from other devices and information included in said received beacons.

4. The method of claim 3, further comprising:
determining a last occupied beacon slot of said at least one contiguous dynamic beacon period based on beacons received from other devices and information included in said received beacons;
a joining device transmitting its beacon in the free beacon slot of said at least one contiguous dynamic beacon period;
detecting by a device that its beacon has collided with a beacon of another device; and
when a device has detected that its beacon has collided with a beacon of another device, said detecting device subsequently transmitting its beacon in the free beacon slot of a dynamic beacon period.

5. The method of claim 1 further comprising:
reserving each of a pre-determined number of beacon slots as a special purpose slot;
a joining device transmitting its beacon in any free beacon slot other than the free beacon slot that is a special purpose slot;
detecting by a device that its beacon has collided with a beacon of another device; and
when a device has detected that its beacon has collided with a beacon of another device, said detecting device subsequently transmitting its beacon in any free beacon slot other than the free beacon slot that is a special purpose slot.

6. The method of claim 1, further comprising:
a joining device performing:
 a. transmitting its beacon in a special purpose slot for at least one superframe, and
 b. thereafter moving its beacon to a different free beacon slot in the at least one contiguous dynamic beacon period; and
a detecting device performing
 a. transmitting its beacon in a special purpose slot for at least one superframe, and
 b. thereafter moving its beacon to a different free beacon slot in the at least one contiguous dynamic beacon period.

7. The method of claim 1, further comprising:
reserving each of a pre-determined number of beacon slots of said at least one contiguous dynamic beacon period as a special purpose slot;
determining at least one free beacon slot of said at least one contiguous dynamic beacon period based on beacons received from other devices and information included in said received beacons; and
a joining device simultaneously transmitting its beacon in the determined at least one free beacon slot and in a special purpose slot for a predetermined number of superframes.

8. The method of claim 1, further comprising:
determining at least one free beacon slot of said at least one contiguous dynamic beacon period based on beacons received from other devices and information included in said received beacons;
detecting by a device that its beacon has collided with a beacon of another device; and
when a device has detected that its beacon has collided with a beacon of another device, said detecting device subsequently performing
 a. simultaneously transmitting its beacon in its previous beacon slot and in one of the determined at least one free beacon slot for a predetermined number of superframes, and
 b. after said simultaneous transmission, only ceasing transmission of a beacon in its previous beacon slot.

9. The method of claim 1, further comprising:
determining a next free beacon slot in the direction of a beginning of said at least one contiguous dynamic beacon period based on beacons received from other devices and information included in said received beacons; and
a device, that has already transmitted at least one beacon, moving its beacon from its previous beacon slot to the determined next free beacon slot.

10. The method of claim 9 wherein said determining further comprises jumping over any occupied beacon slot that is one of not able to move and not willing to move.

11. The method of claim 9, wherein said moving further comprises simultaneously transmitting its beacon in its previous beacon slot and in the determined at least one free beacon slot for a predetermined number of superframes.

12. The method of claim 9, further comprising, prior to said moving, the device
reserving each of a pre-determined number of beacon slots of said at least one contiguous dynamic beacon period as a special purpose slot; and
transmitting a beacon in a special purpose slot.

13. The method of claim 1 further comprising:
reserving each of a pre-determined number of beacon slots of said at least one contiguous dynamic beacon period as a special purpose slot;
determining at least one free beacon slot of said at least one contiguous dynamic beacon period based on a slot not being a special purpose slot and beacons received from other devices and information included in said received beacons; and
a beaconing device moving its beacon to the determined at least one free beacon slot.

14. The method of claim 13, wherein the determining further comprises determining said at least one free beacon slot as the first beacon slot in the at least one contiguous dynamic beacon period after a beginning of the at least one contiguous dynamic beacon period.

15. The method of claim 13, further comprising, prior to said moving, transmitting a beacon in a special purpose slot.

16. The method of claim 1, further comprising:
- a device, that has already transmitted at least one beacon, ascertaining that the beacon slot of the device is the last beacon slot of said at least one contiguous dynamic beacon period based on beacons received from other devices and information included in said received beacons, and
- when the device ascertains that its beacon slot is the last beacon slot, moving its beacon from its previous beacon slot to the determined at least one free beacon slot.

17. The method of claim 1, further comprising a device announcing in its beacon the length of the dynamic beacon period based on beacons received from other devices and information included in said received beacons.

18. A communications network comprising a plurality of devices that include dynamic beacon periods for transmission of their beacon frames by performing the decentralized medium access control method of claim 1.

19. The method of claim 1, wherein said free beacon slot is a first free beacon slot after the last occupied beacon slot.

20. The method of claim 1, wherein said free beacon slot is a randomly-chosen free slot within a pre-determined number of beacon slots after the last occupied beacon slot.

21. A wireless device that manages beaconing over a wireless medium in a distributed manner, comprising:
- an antenna for sending and receiving beacons over the wireless medium;
- a receiver coupled to the antenna to receive beacons transmitted over the wireless medium;
- a transmitter coupled to the antenna to transmit beacons over the wireless medium;
- a beacon processing module to process sent and received beacons for distributed beaconing management over the medium;
- a processor to divide time into a sequence of at least one superframe, each said superframe having at least one dynamic beacon period having a dynamic length with a pre-determined upper bound and that includes a plurality of beacon slots, and coupled to:
  i. the transmitter and the receiver to send and receive, respectively, beacon frames during said at least one dynamic beacon period of the at least one superframe,
  ii. the beacon processing module to—
    manage dynamic beacon period format and length including dynamic determination of dynamic beacon period length, inclusion of a predetermined plurality of beacon slot types, recordation of beacon slot occupancy and implementation of beacon slot switches,
    format beacon frames for transmission comprising each of the beacon slot types, such that the beacon frame announces a length of the beacon frame dynamically determined by the device, and
    format a beacon frame for transmission in the at least one beacon slot, that includes beacon slot occupancy information and beacon slot switch information.

22. The wireless device of claim 21, wherein:
each superframe further comprises a plurality of medium access slots allocated between said at least one contiguous dynamic beacon period and a data transmission phase;
the wireless device further comprising
- a bitmap operably connected to said processor and arranged to have at least one bit that corresponds to a beacon slot of said at least one contiguous dynamic beacon period, and
- a memory operably connected to said processor and arranged to store beacon slot occupancy information of each beacon transmitted by said transmitter and received by said receiver; and
said beacon processing module further configured to
- set and reset said at least one bit of said bitmap via said processor in accordance with beacon slot occupancy information in said transmitted and received beacons, and
- store and delete information concerning beacon slot occupancy, dynamic beacon period position and length that is contained in beacons transmitted by said transmitter and received by said receiver.

23. The wireless device of claim 21, wherein at least one free beacon slot of said at least one contiguous dynamic beacon period is determined based on beacons received from other devices and information included in said received beacons.

24. The wireless device of claim 21, wherein said free beacon slot is a first free beacon slot after the last occupied beacon slot.

25. The wireless device of claim 21, wherein said free beacon slot is a randomly-chosen free slot within a pre-determined number of beacon slots after the last occupied beacon slot.

* * * * *